United States Patent [19]

Lausberg et al.

[11] Patent Number: 4,940,746

[45] Date of Patent: Jul. 10, 1990

[54] GLASS FIBER REINFORCED THERMOPLASTIC MOLDING COMPOSITIONS BASED ON POLYESTERS AND GRAFT POLYMERS

[75] Inventors: Dietrich Lausberg, Ludwigshafen; Wolfgang Seydl, Bobenheim-Roxheim; Manfred Knoll, Wachenheim; Erhard Seiler, Ludwigshafen; Herbert Gutsche, Beindersheim; Peter Kolm, Neustadt, all of Fed. Rep. of Germany

[73] Assignee: BASF Aktiengesellschaft, Ludwigshafen, Fed. Rep. of Germany

[21] Appl. No.: 254,802

[22] Filed: Oct. 7, 1988

[30] Foreign Application Priority Data

Oct. 7, 1987 [DE] Fed. Rep. of Germany ....... 3733857

[51] Int. Cl.$^5$ .............................................. C08K 7/14
[52] U.S. Cl. .................................. 524/504; 523/435; 523/436
[58] Field of Search ................ 523/435, 436; 524/504; 525/64, 65

[56] References Cited

U.S. PATENT DOCUMENTS

| | | | |
|---|---|---|---|
| 4,145,331 | 3/1979 | Sterzel et al. | 524/504 |
| 4,397,986 | 8/1983 | Hornbaker | 525/64 |
| 4,404,161 | 9/1983 | Bier | 525/64 |
| 4,659,767 | 4/1987 | Dunkle et al. | 525/64 |
| 4,739,010 | 4/1988 | McKee et al. | 525/64 |

FOREIGN PATENT DOCUMENTS 2758497 7/1978 Fed. Rep. of Germany .

*Primary Examiner*—Lewis T. Jacobs
*Attorney, Agent, or Firm*—Oblon, Spivak, McClelland, Maier & Neustadt

[57] ABSTRACT

Thermoplastic molding composition based on thermoplastic polyesters ($a_1$), graft polymers incorporating acrylate rubbers as grafting base ($a_2$), copolymers of aromatic vinyl monomers and acrylonitrile or methacrylonitrile ($a_3$) and glass fibers (B) have particularly good mechanical properties if the (meth)acrylonitrile content in component ($a_3$), based on the total weight of ($a_3$), is less than the (meth)acrylonitrile content of component ($a_{22}$).

2 Claims, No Drawings

GLASS FIBER REINFORCED THERMOPLASTIC MOLDING COMPOSITIONS BASED ON POLYESTERS AND GRAFT POLYMERS

The present invention relates to thermoplastic molding compositions containing as essential components
(A) from 45 to 90% by weight of a mixture of
  ($a_1$) from 50 to 80% by weight of a polyester
  ($a_2$) from 10 to 25% by weight of a graft polymer built up from
    ($a_{21}$) from 50 to 90% by weight of a grafting base comprising an elastomeric polymer based on
      ($a_{211}$) from 95 to 99.9% by weight of a $C_2$–$C_{10}$-alkyl acrylate and
      ($a_{212}$) from 0.1 to 5% by weight of a polyfunctional monomer having at least two olefinic, non-conjugated double bonds
    ($a_{22}$) from 10 to 50% by weight of a graft surface comprising
      ($a_{221}$) from 50 to 90% by weight of styrene or substituted styrene of the general formula I

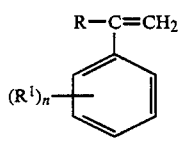

where R is alkyl of from 1 to 8 carbon atoms, hydrogen or halogen, $R^1$ is alkyl of from 1 to 8 carbon atoms or halogen, and n is 0, 1, 2 or 3, or a mixture thereof, and
      ($a_{222}$) from 10 to 50% by weight of acrylonitrile or methacrylonitrile or a mixture thereof and
      ($a_{223}$) from 0 to 10% by weight of a monomer having carboxyl, carboxyl derivative, hydroxyl or epoxy groups
  ($a_3$) from 10 to 25% by weight of a copolymer of
    ($a_{31}$) from 55 to 90% by weight of styrene or substituted styrene of the general formula I or of mixtures thereof
    ($a_{32}$) from 10 to 45% by weight of acrylonitrile or methacrylonitrile or a mixture thereof,
    ($a_{33}$) from 0 to 10% by weight of a monomer having carboxyl, carboxyl derivative, hydroxyl or epoxy groups and
(B) from 5 to 50% by weight of glass fibers, with the proviso that the proportion of component ($a_{32}$), based on the total weight of component ($a_3$), is lower by not less than 5% by weight than the weight proportion of component ($a_{222}$), based on the total weight of component ($a_{22}$).

The present invention also relates to the use of such molding compositions for producing moldings and the moldings obtainable from the molding compositions according to the invention as essential components.

DE-B-2,758,497 describes thermoplastic molding compositions based on polyesters and modified styrene/acrylonitrile (SAN) copolymers using as modifying agents acrylic esters and/or α-methylstyrene. In the examples, ASA polymers are used as modified SAN polymers. If the modified SAN polymer is the main component in these compositions, films are producible therefrom with advantage. The mechanical properties, however, are still not fully satisfactory as a whole, in particular as regards the impact resistance and bending strength.

It is an object of the present invention to provide thermoplastic molding compositions based on polyesters and graft polymers free of the above-described disadvantages.

We have found that this object is achieved by means of the thermoplastic molding compositions defined at the beginning.

As component A, the molding compositions according to the invention contain from 45 to 90, in particular from 55 to 90, particularly preferably from 60 to 85, by weight of a mixture of
($a_1$) from 50 to 80% by weight of a polyester
($a_2$) from 10 to 25% by weight of a graft polymer and
($a_3$) from 10 to 25% by weight of a styrene/(meth)acrylonitrile copolymer.

The polyesters ($a_1$) contained in the molding compositions according to the invention are known per se. Preference is given to using polyesters which contain an aromatic ring in the main chain. The aromatic ring may also be substituted, for example by halogens, such as chlorine and bromine, and/or by $C_1$–$C_4$-alkyl groups, for example methyl, ethyl, i- or n-propyl and i-, n- or t-butyl.

The polyesters may be prepared by reacting dicarboxylic acids, esters thereof or other ester-forming derivatives thereof with dihydroxy compounds in a conventional manner.

Suitable dicarboxylic acids are for example aliphatic and aromatic dicarboxylic acids, which may also be used mixed. Examples thereof are naphthalenedicarboxylic acids, terephthalic acid, isophthalic acid, adipic acid, azelaic acid, sebacic acid, dodecanedioic acid and cyclohexanedicarboxylic acids, mixtures of these carboxylic acids and ester-forming derivatives thereof.

The dihydroxy compounds used are preferably diols of from 2 to 6 carbon atoms, particularly preferably ethylene glycol, 1,4-butanediol, 1,4-butenediol and 1,6-hexanediol; but it is also possible to use 1,4-hexanediol, 1,4-cyclohexanediol, 1,4-di(hydroxymethyl)cyclohexane, bisphenol A, neopentylglycol, mixtures of these diols and ester-forming derivatives thereof.

Polyesters of terephthalic acid and a $C_2$–$C_6$-diol component, e.g. polyethylene terephthalate or polybutylene terephthalate or mixtures thereof, are particularly preferred.

The relative viscosity $\eta_{spec}/c$ of the polyesters, measured in 0.5% strength by weight solution in a phenol-/o-dichlorobenzene mixture (weight ratio 3:2) at 25° C., is in general within the range from 1.2 to 1.8 dl/g.

The proportion of polyester a1) in component A is from 50 to 80, preferably from 50 to 75, in particular from 50 to 70, % by weight, based on the total weight of components ($a_1$)+($a_2$)+($a_3$).

The graft polymer ($a_2$), which accounts for from 10 to 25, in particular from 12 to 25, particularly preferably from 12 to 20, % by weight of component A is built up from
($a_{21}$) from 50 to 90% by weight of a grafting base based on
  ($a_{211}$) from 95 to 99.9% by weight of a $C_2$–$C_{10}$-alkyl acrylate and
  ($a_{212}$) from 0.1 to 5% by weight of a polyfunctional monomer having at least two olefinic, non-conjugated double bonds and
($a_{22}$) from 10 to 50% by weight of a graft surface comprising (a₂₂₁) from 50 to 90% by weight of styrene or substituted styrene of the general formula I or a mixture thereof and (a₂₂₂) from 10 to 50% by weight of acrylonitrile or methacrylonitrile or a mixture thereof (a₂₂₃) from 0 to 10% by weight of a monomer having carboxyl, carboxyl derivative, hydroxyl or epoxy groups.

Component (a₂₁) is an elastomer having a glass transition temperature of below −20° C., in particular below −30° C.

To prepare the elastomer, the main monomer (a₂₁₁) comprises an ester of acrylic acid of from 2 to 10 carbon atoms, in particular of from 4 to 8 carbon atoms. Particularly preferred monomers here are tert-, iso- and n-butyl acrylate and also 2-ethylhexyl acrylate, of which the last two are particularly preferred.

These esters of acrylic acid are used together with from 0.1 to 5, in particular from 1 to 4, % by weight, based on the total weight of a₂₁₁+a₂₁₂, of a polyfunctional monomer having at least two olefinic, non-conjugated double bonds. Of these, difunctional compounds, i.e. those having two non-conjugated double bonds, are preferred. Examples thereof are divinylbenzene, diallyl fumarate, diallyl phthalate, triallyl cyanurate, triallyl isocyanurate, tricyclodecenyl acrylate and dihydrocyclopentadienyl acrylate, of which the last two are particularly preferred.

Processes for preparing the grafting base (a₂₁) are known per se and described for example in DE-B-1,260,135. Corresponding products are also commercially available.

A particularly advantageous option in some cases is the preparation by emulsion polymerization.

The exact polymerization conditions, in particular the type, the rate of metering and the amount of the emulsifier, are preferably chosen in such a way that the latex of the acrylic ester, which is at least partially crosslinked, has an average particle size (weight average $d_{50}$) within the range from about 200 to 700, in particular from 250 to 600, nm. Preferably, the latex has a narrow particle size distribution, ie. the ratio $$Q = \frac{d_{90} - d_{10}}{d_{50}}$$

is preferably less than 0.5, in particular less than 0.35.

The proportion of grafting base (a₂₁) in graft polymer (a₂) is from 50 to 90, preferably from 55 to 85, in particular from 60 to 80, % by weight, based on the total weight of (a₂).

The grafting base (a₂₁) has been grafted with a graft sheath (a₂₂) which is obtainable by copolymerization of (a₂₂₁) from 50 to 90, preferably from 60 to 90, in particular from 65 to 80, % by weight of styrene or substituted styrene of the general formula I

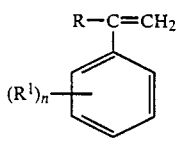

where R is alkyl of from 1 to 8 carbon atoms, hydrogen or halogen and R¹ is alkyl of from 1 to 8 carbon atoms or halogen, and n is 0, 1, 2 or 3, and (a₂₂₂) from 10 to 50, preferably from 10 to 40, in particular from 20 to 35, % by weight of acrylonitrile or methacrylonitrile or a mixture thereof (a₂₂₃) from 0 to 10% by weight of a monomer having carboxyl, carboxyl derivative, hydroxyl or epoxy groups.

Examples of substituted styrenes are α-methylstyrene, p-methylstyrene, p-chlorostyrene and p-chloro-α-methylstyrene, of which styrene and α-methylstyrene are preferred.

The graft sheath (a₂₂) may be prepared in one or more, for example two or three, steps; this has no effect on the overall composition.

If monomers (a₂₂₃) are present, their proportion in graft sheath (a₂₂) is from 0.1 to 10, preferably from 0.2 to 10, in particular from 0.5 to 8, % by weight, based on the total weight of (a₂₂).

Examples of monomers (a₂₂₃) are glycidyl methacrylate, glycidyl acrylate, allyl glycidyl ether, vinyl glycidyl ether and glycidyl itaconate, and also acrylic acid, methacrylic acid and their metal, in particular alkali metal, salts and ammonium salts, tertiary esters of acrylic acid and methacrylic acid, maleic acid, maleic anhydride, metal salts of the acid monoethyl ester of maleic acid, fumaric acid, monoethyl fumarate, itaconic acid, vinylbenzoic acid, vinylphthalic acid, salts of monoethyl fumarate, monoesters of maleic acid, fumaric acid and itaconic acid with alcohols ROH where R has up to 29 carbon atoms, e.g. methyl, propyl, isopropyl, butyl, isobutyl, hexyl, cyclohexyl, octyl, 2-ethylhexyl, decyl, stearyl, methoxyethyl, ethoxyethyl and hydroxyethyl.

Although maleic anhydride and metal salts (in particular alkali metal and alkaline earth metal salts) of polymerizable carboxylic acids have no free carboxyl groups, they behave so similarly to the free acids that, for the purposes of the present invention, they shall be encompassed here under the generic term carboxyl-containing monomers.

A second group of suitable monomers (a₂₂₃) are monomers containing lactam groups.

They contain a lactam group of the general formula

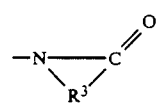

where R³ is a branched or linear alkylene of from 2 to 15 carbon atoms.

Merely representative examples thereof are β-propiolactams (acetidin-2-ones) of the general formula

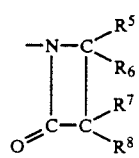

where the substituents R⁵ to R⁸ may each be alkyl of from 1 to 6 carbon atoms or hydrogen. They are described by R. Graf in Angew. Chem. 74 (1962), 523–530, and H. Bastian in Angew. Chem. 80 (1968), 304–312. Examples thereof are 3,3'-dimethyl-3-propiolactam, 2-pyrrolidones

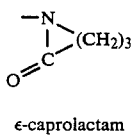

ε-caprolactam

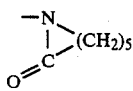

7-enantholactam, 8-capryllactam and 12-laurolactam, as also described by H. Dachs, Angew. Chemie 74 (1962), 540–45.

Of these, 2-pyrrolidones and ε-caprolactams are particularly preferred.

Preferably, the lactam groups as in

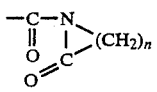

are incorporated in the corresponding monomers via a carbonyl group on the nitrogen.

A particularly preferred example thereof is N-(meth)acryloyl-ε-caprolactam

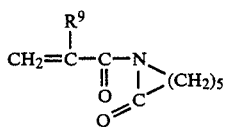

where $R^9$ is hydrogen or methyl.

Preferred monomers ($a_{223}$) are glycidyl esters of acrylic acid and methacrylic acid, maleic anhydride, tert.-butylacrylate, fumaric acid and maleic acid.

Preferably, the graft sheath is prepared in emulsion as described for example in German Pat. No. 1,260,135 and German Laid-Open Applications DOS 3,227,555, DOS 3,149,357 and DOS 3,414,118.

Depending on the conditions chosen, the graft copolymerization gives rise to a certain proportion of free copolymers of styrene or substituted styrene derivatives and (meth)acrylonitrile and of any monomers ($a_{223}$).

The graft copolymer ($a_{21}+a_{22}$) has in general an average particle size of from 100 to 1,000 nm, in particular of from 200 to 700 nm ($d_{50}$ weight average). The conditions for preparing the elastomer $b_1$) and for the grafting are therefore preferably chosen so as to produce particle sizes within this range. Measures to this end are known and described for example in German Pat. No. 1,260,135, German Laid-Open Application DOS 2,826,925 and J. Appl. Polym. Sci. 9 (1965), 2929–38. Enlarging the particle size of the latex of elastomer may be accomplished for example by means of agglomeration.

For the purposes of the present invention the graft polymer $a_2$ also includes the free, non-grafted homopolymers and copolymers which form in the course of the graft copolymerization for preparing component ($a_{22}$).

In what follows, some preferred graft polymers are specified:

$a_2/1$: 60% by weight of grafting base ($a_{21}$) from
  ($a_{211}$) 98% by weight of n-butyl acrylate and
  ($a_{212}$) 2% by weight of dihydrodicyclopentadienyl acrylate and
  40% by weight of graft sheath ($a_{22}$) from
  ($a_{221}$) 75% by weight of styrene and
  ($a_{222}$) 25% by weight of acrylonitrile $a_2/2$: grafting base as in the case of $a_2/1$, together with 5% by weight of a first graft sheath of styrene and 35% by weight of a second graft stage of
  ($a_{221}$) 75% by weight of styrene and
  ($a_{222}$) 25% by weight of acrylonitrile $a_2/3$: grafting base as in $a_2/1$, together with 13% by weight of a first graft stage of styrene and 27% by weight of a second graft stage from styrene and acrylonitrile in a weight ratio of 3:1.

Component ($a_3$) in the molding compositions according to the invention comprises from 10 to 25, preferably from 12 to 20, % by weight of a copolymer of
($a_{31}$) from 50 to 90, preferably from 60 to 90, in particular from 75 to 90% by weight of styrene and/or substituted styrene of the general formula I and
($a_{32}$) from 10 to 45, preferably from 10 to 40, in particular from 10 to 25, % by weight of acrylonitrile and/or methacrylonitrile
($a_{33}$) from 0 to 10% by weight of a monomer having carboxyl, carboxyl derivative, hydroxyl or epoxy groups.

Products of this type may be prepared for example by the process described in German Published Applications DAS 1,001,001 and DAS 1,003,436. Such copolymers are also commercially available. Preferably, the weight average molecular weight determined by light scattering is within the range from 50,000 to 500,000, in particular from 100,000 to 250,000.

Monomers ($a_{33}$) are subject to the above remarks concerning component ($a_{223}$), to which reference is made here to avoid repetition.

The weight ratio of $a_2:a_3$ is within the range from 1:2.5 to 2.5:1, preferably from 1:2 to 2:1, in particular from 1:1.5 to 1.5:1.

It is essential for the mechanical properties, in particular the impact strength, of the molding compositions according to the invention that the level in component ($a_3$) of acrylonitrile and/or methacrylonitrile, based on the total weight of component ($a_3$), is not less than 5% by weight lower than the level in component ($a_{22}$) of acrylonitrile and/or methacrylonitrile (based on the total weight of component ($a_{22}$)).

Component B in the molding compositions according to the invention comprises from 5 to 50, in particular from 7 to 45, particularly preferably from 10 to 40, % by weight, based on the total weight of the molding compositions, of glass fibers. They are commercially available products.

In the molding composition, these glass fibers generally have an average length of from 0.1 to 0.5 mm, preferably from 0.1 to 0.4 mm, and a diameter within the range from 6 to 20 μm. Particular preference is given to glass fibers made of E-glass. To obtain better adhesion, the glass fibers may have been coated with organosilanes, epoxysilanes or other polymer coatings.

Aside from components (A) and (B), the molding compositions according to the invention may contain customary additives and processing aids.

Customary additives are for example stabilizers and oxidation retarders, agents against thermal decomposition and decomposition by ultraviolet light, lubricants and mold release agents, colorants, such as dyes and pigments, pulverulent fillers and reinforcing agents and plasticizers. Such additives are used in the customary active amounts.

The stabilizers may be added to the thermoplastic compositions at any stage of processing. Preferably, the stabilizers are added early on in order to prevent the onset of decomposition before the composition has been protected. Such stabilizers have to be compatible with the composition.

The oxidation retarders and heat stabilizers which may be added to the thermoplastic compositions according to the invention include those which are generally added to polymers, such as halides of metals of group I of the periodic table, e.g. sodium halides, potassium halides or lithium halides in conjunction with copper(I) halides, for example chloride, bromide or iodide. Further suitable stabilizers are sterically hindered phenols, hydroquinones, various substituted representatives of this group and combinations thereof in concentrations up to 1% by weight, based on the weight of the mixture.

Suitable UV stabilizers are likewise those which are generally added to polymers in amounts of up to 2.0% by weight, based on the total weight of the mixture. Examples of UV stabilizers are various substituted resorcinols, salicylates, benzotriazoles, benzophenones and the like.

Suitable lubricants and mold release agents, added for example in amounts of up to 1% by weight to the thermoplastic composition, are stearic acids, stearyl alcohol, stearic esters and stearic amides.

It is also possible to add organic dyes such as nigrosine, pigments, for example titanium dioxide, cadmium sulfide, cadmium sulfide/selenide, phthalocyanines, ultramarine blue and carbon black.

It is also possible to employ nucleating agents, such as talc, calcium fluoride, sodium phenylphosphinate, aluminum oxide or finely divided polytetrafluoroethylene, in amounts of for example up to 5% by weight, based on the composition. Plasticizers, such as dioctyl phthalate, dibenzyl phthalate, butyl benzyl phthalate, hydrocarbon oils, N-(n-butyl)benzenesulfonamide, o- and p-tolueneethylsulfonamide, are advantageously added in amounts of up to about 20% by weight, based on the molding composition. Colorants such as dyes and pigments may be added in amounts of up to about 5% by weight, based on the molding composition.

The molding compositions according to the invention can be prepared by mixing components ($a_1$), ($a_2$) and ($a_3$), melting in an extruder and adding the glass fibers via an inlet on the extruder. Such methods are known per se and described in the literature. The mixing temperatures in the extruder are in general within the range from 240° to 300° C.

The molding compositions according to the invention are notable for good strength, high impact resistance and the particularly good surface structure of the moldings produced therefrom.

EXAMPLES 1 TO 10

The following components were used:

$a_1$ Polybutylene terephthalate having a viscosity number of 108, as determined in accordance with German Standard Specification DIN 53,728 Part 3

$a_2/1$ Graft polymer from 60 parts by weight of a mixture of
- ($a_{211}$) 98% by weight of n-butylacrylate and
- ($a_{212}$) 2% by weight of dihydrodicyclopentadienyl acrylate as a grafting base and 40% by weight of a mixture of
- ($a_{221}$) 75% by weight of styrene and
- ($a_{222}$) 25% by weight of acrylonitrile as graft surface.

$a_2/2$ Graft polymer from 60% by weight of a grafting base as in $a_2/1$ and 40% by weight of a graft surface from
- ($a_{221}$) 70% by weight of styrene and
- ($a_{222}$) 30%, by weight of acrylonitrile.

$a_2/3$ Graft polymer from 60% by weight of a grafting base as in $a_2/1$ and 40% by weight of a graft surface from
- ($a_{221}$) 80% by weight of styrene and
- ($a_{222}$) 20% by weight of acrylonitrile ($a_3/1$) Copolymer of
- ($a_{31}$) 81% by weight of styrene and
- ($a_{32}$) 19% by weight of acrylonitrile having a viscosity number of 100, measured in a 0.5% strength by weight solution in dimethylformamide (DMF) at 25° C.

$a_3/2$ Copolymer of
- ($a_{31}$) 65% by weight of styrene and
- ($a_{32}$) 35% by weight of acrylonitrile having a viscosity number of 80, measured as in the case of $a_3/1$ B glass fibers made of E-glass.

Components $a_1$, $a_2$ and $a_3$ were mixed, melted in an extruder and admixed with glass fibers introduced via the extruder. The extrusion temperature was 260° C. The compositions were then extruded into a water bath, granulated and dried. Thereafter, without further aftertreatment, test specimens were produced on a injection molding machine.

The mechanical properties were determined as follows:

Modulus of elasticity: German Standard Specification DIN 53,457

Impact strength $a_n$: German Standard Specification DIN 53,453 (at 23° C.)

Notched impact strength: German Standard Specification DIN 53,453 (at 23° C.)

The compositions and results of the measurements are given in the Table.

TABLE

| | (all amounts in % by weight) | | | | | | |
|---|---|---|---|---|---|---|---|
| | Composition in % by weight | | | | Modulus of elasticity | Impact strength | Notched impact strength |
| Ex. | $a_1$ | $a_2$ | $a_3$ | B | N/mm | kJ/m$^2$ | kJ/m$^2$ |
| 1V | 49 | 11 $a_2/1$ | 10 $a_3/2$ | 30 | 9300 | 35 | 7.5 |
| 2V | 42 | 14 $a_2/1$ | 14 $a_3/2$ | 30 | 9300 | 34 | 8.0 |
| 3 | 49 | 11 $a_2/1$ | 11 $a_3/1$ | 30 | 9400 | 42 | 9.5 |
| 4 | 49 | 13 $a_2/1$ | 8 $a_3/1$ | 30 | 8600 | 45 | 10.5 |
| 5 | 49 | 11 $a_2/2$ | 10 $a_3/1$ | 30 | 9500 | 41 | 9.0 |
| 6V | 49 | 11 $a_2/3$ | 10 $a_3/1$ | 30 | 9400 | 33 | 7.0 |
| 7V | 42 | 14 $a_2/3$ | 14 $a_3/1$ | 30 | 9200 | 33 | 8.0 |
| 8 | 42 | 14 $a_2/1$ | 14 $a_3/1$ | 30 | 9400 | 40 | 10.0 |
| 9 | 42 | 18 $a_2/1$ | 10 $a_3/1$ | 30 | 8400 | 47 | 12.0 |
| 10 | 42 | 14 $a_2/2$ | 14 $a_3/1$ | 30 | 9400 | 41 | 10.5 |

V = comparative test

We claim:
1. A flameproofed thermoplastic molding composition containing as essential components
(A) from 45 to 90% by weight of a mixture of
 ($a_1$) from 50 to 80% by weight of a polyester
 ($a_2$) from 10 to 25% by weight of a graft polymer built up from

($a_{21}$) from 50 to 90% by weight of a grafting base comprising an elastomeric polymer based on
($a_{211}$) from 95 to 99.9% by weight of a $C_2$–$C_{10}$-alkyl acrylate and
($a_{212}$) from 0.1 to 5% by weight of a polyfunctional monomer having at least two olefinic, non-conjugated double bonds
($a_{22}$) from 10 to 50% by weight of a graft surface comprising
($a_{221}$) from 50 to 90% by weight of styrene or substituted styrene of the general formula I

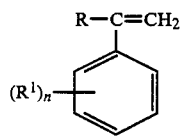

where R is alkyl of from 1 to 8 carbon atoms, hydrogen or halogen, $R^1$ is alkyl of from 1 to 8 carbon atoms or halogen, and n is 0, 1, 2 or 3, or a mixture thereof, and
($a_{222}$) from 10 to 50% by weight of acrylonitrile or methacrylonitrile or a mixture thereof and
($a_{223}$) from 0 to 10% by weight of a monomer having carboxyl, carboxyl derivative, hydroxyl or epoxy groups and
($a_3$) from 10 to 25% by weight of a copolymer of
($a_{31}$) from 55 to 90% by weight of styrene or substituted styrene of the general formula I or of mixtures thereof and
($a_{32}$) from 10 to 45% by weight of acrylonitrile or methacrylonitrile or a mixture thereof,
($a_{33}$) from 0 to 10% by weight of a monomer having carboxyl, carboxyl derivative, hydroxyl or epoxy groups and (B) from 5 to 50% by weight of glass fibers, with the proviso that the proportion of component ($a_{32}$), based on the total weight of component ($a_3$), is lower by not less than 5% by weight than the weight proportion of component ($a_{222}$), based on the total weight of component ($a_{22}$).

2. A thermoplastic molding composition as claimed in claim 1 containing as essential components
(A) from 55 to 90% by weight of a mixture of
($a_1$) from 50 to 80% by weight of polyethylene terephthalate or polybutylene terephthalate or a mixture thereof
($a_2$) from 10 to 25% by weight of a graft polymer built up from
($a_{21}$) from 50 to 90% by weight of a grafting base based on
($a_{211}$) from 95 to 99.9% by weight of a n-butyl acrylate and/or 2-ethylhexyl acrylate and
($a_{212}$) from 0.1 to 5% by weight of a difunctional monomer and
($a_{22}$) from 10 to 50% by weight of a graft surface comprising
($a_{221}$) from 50 to 90% by weight of styrene or α-methylstyrene or a mixture thereof and
($a_{222}$) from 10 to 50% by weight of acrylonitrile or methacrylonitrile or a mixture thereof and
($a_3$) from 10 to 25% by weight of a copolymer of
($a_{31}$) from 55 to 90% by weight of styrene or α-methylstyrene or of mixtures thereof and
($a_{32}$) from 10 to 45% by weight of acrylonitrile or methacrylonitrile or a mixture thereof, and
(B) from 10 to 40% by weight of glass fibers, with the proviso that the proportion of component ($a_{32}$), based on the total weight of component ($a_3$), is lower by not less than 5% by weight than the weight proportion of component ($a_{222}$), based on the total weight of component ($a_{22}$).

* * * * *